United States Patent [19]

Stove

[11] Patent Number: 4,968,967
[45] Date of Patent: Nov. 6, 1990

[54] CONTINUOUSLY TRANSMITTING AND RECEIVING RADAR

[75] Inventor: Andrew G. Stove, Reigate, England

[73] Assignee: U.S. Philips Corporation, New York, N.Y.

[21] Appl. No.: 418,378

[22] Filed: Oct. 6, 1989

[30] Foreign Application Priority Data

Oct. 14, 1988 [GB] United Kingdom ............... 8824164

[51] Int. Cl.$^5$ ............................................. G01S 13/32
[52] U.S. Cl. .................................................. 342/165
[58] Field of Search ............... 342/128, 165, 127, 198, 342/175

[56] References Cited

U.S. PATENT DOCUMENTS

| | | | |
|---|---|---|---|
| 3,256,520 | 6/1966 | Blitz | 342/128 |
| 4,682,175 | 7/1987 | Lazarus | 342/165 |
| 4,725,842 | 2/1988 | Mayberry | 342/198 |
| 4,825,214 | 4/1989 | Dejaegher | 342/128 |

Primary Examiner—Thomas H. Tarcza
Assistant Examiner—Mark Hellner
Attorney, Agent, or Firm—Robert J. Kraus

[57] ABSTRACT

A continuously transmitting and receiving radar comprises a transmitter (10), a receiver (16), an antenna (12) and a circulator (14) for effecting communication between the transmitter and the antenna and between the antenna and the receiver. A reflected power canceller is provided for suppressing the effects of leakage between the transmitter and receiver. The reflected power canceller comprises a directional coupler (20) for supplying a part of the transmitted signal to a modulator (22) which forms a cancelling signal by adjusting the phase and amplitude of the sampled signal. The cancelling signal is applied to another directional coupler (24) which subtracts the cancelling signal from the leakage and wanted signals. A narrowband control path is connected between the output of the receiver (16) and the modulator (22). The reduction in carrier leakage and AM noise sidebands is made more effective by providing a time delay device (21) in the signal path from the coupler (20) to the modulator (22). The time delay introduced by the device (21) is set so that the propagation times between the transmitter (10) and the directional coupler (24) via the circulator (14) and via the modulator (22) are the same. Optionally FM noise can be reduced by ensuring the propagation time of the local oscillator signal applied to a mixer in the receiver (16) is the same as that of the leakage path between the transmitter and receiver.

4 Claims, 2 Drawing Sheets

CONTINUOUSLY TRANSMITTING AND RECEIVING RADAR

BACKGROUND OF THE INVENTION

The present invention relates to continuously transmitting and receiving radar, for example a continuous wave (CW) radar, and more particularly to the suppression of leakage (otherwise known as feedthrough) in such a radar.

A leakage or feedthrough signal comprises an unpropagated portion of the transmitted energy which is fed directly to the radar receiver resulting in saturation of, damage to and/or degradation of sensitivity of the receiver.

The Radar Handbook (Editor M. I. Skolnik, McGraw-Hill, New York, 1970), pages 16-18 and 16-19 discusses minimisation of feedthrough using a dynamic canceller. All dynamic cancellers depend on synthesising a proper amplitude and phase of a signal taken from the transmitter and using this to cancel the feedthrough signal. These pages also mention that microwave feedthrough cancellation is of principal value in preventing saturation and in minimising the effects of AM noise. Because of the correlation effect, FM noise produced by feedthrough tends to cancel in the receiver. Near-in AM and FM noise produced by clutter is also beneficially reduced by a feedthrough servo, since, in nulling out the carrier, it automatically removes both sidebands, whatever their origin, as long as the decorrelation interval is short. Clutter signals from long ranges have both AM and FM noise that is essentially decorrelated, and feed-through nulling of these signals may increase their deviation by a factor of 2 or their power by a factor of 4.

U.S. Pat. No. 3,021,521 discloses a feedthrough nulling system for a CW radar in which a feedthrough signal is cancelled by a correcting signal produced within the radar. More particularly the radar comprises a transmitter coupled by a duplexer to an antenna. This antenna is also coupled by the same duplexer to a receiver. The correcting signal is produced by sampling a portion of the transmitter signal using a first directional coupler. The sample is fed to a phase and amplitude control stage in which it is operated on to produce the correcting signal which is equal in magnitude and opposite in phase to the feedthrough signal. This correcting signal is fed to a second directional coupler where it is combined with the antenna return signal and the feedthrough energy in the signal path from the duplexer to the receiver cancelling the feedthrough signal.

This known technique is primarily for cancelling a feedthrough signal consisting of the carrier frequency. However, U.S. Pat. No. 3,021,521 does not appear to address itself to overcoming the problems of (1) FM noise sidebands present in the leakage signal, (2) the leakage signal power being high enough to degrade the sensitivity of or damage the receiver, and (3) the AM sidebands of the leakage being high enough to degrade the sensitivity of the receiver. Other aspects of the method/technique for suppressing leakage should take into account that the amplitude of the correcting signal is limited by what can be handled by a modulator and that if a control loop is provided having a broad band then there is a danger of the wanted signals being cancelled.

A method of solving the first of the above-mentioned problems is disclosed in British Patent Specification No. 2147473B which describes a method of FM noise reduction in a CW radar system. The system comprises a master oscillator, means for transmitting an RF signal derived from the oscillator and for receiving a return signal, and a mixer having a local-oscillator port and a signal port. A local oscillator signal is obtained by coupling-out a portion of the master oscillator signal. A leakage signal may reach the signal port of the mixer otherwise than along the propagation path of the local oscillator signal and without being reflected externally of the system, for example by reflection of the signal supplied to the transmitting means. In order to minimise noise in the mixer due to FM noise in the leakage signal, the electrical lengths over the operating frequency range of the system from the master oscillator to the local oscillator port and to the signal port of the mixer of the propagation paths of the local oscillator signal and the leakage signal respectively are made substantially equal, for example by including a delay line in the local oscillator signal path. Since FM noise power decreases with increasing offset from the carrier frequency (that is the transmitted frequency), this known method of noise reduction is particularly suited to alleviating noise at low intermediate frequencies (IFs). Additionally noise reduction systems are particularly useful with frequencies in the millimeter-wave range for which currently available oscillators tend to be rather noisy.

SUMMARY OF THE INVENTION

An object of the present invention is to reduce the likelihood of the receiver being damaged or desensitised by the power of the leakage signal being too high.

According to a first aspect of the present invention there is provided a method of reducing the effects of leakage in a radar comprising a substantially continuously operable transmitter, a substantially continuously operable receiver and signal propagating means for simultaneously radiating the transmitter signal and receiving a return signal, the method comprising deriving a portion of the signal as transmitted, using said portion to form a correcting signal whose phase and amplitude are adjusted to correspond substantially to that of the carrier leakage and AM noise sidebands present with the return signal, subtracting the correcting signal from the carrier leakage and AM noise sidebands in the signal path from the signal propagation means and including the receiver, detecting any residual carrier remaining after the subtraction and providing a low frequency signal for controlling the adjustment of the phase and amplitude of the sampled signal to reduce the carrier leakage and AM noise, the method further comprising equalising the propagation times between the transmitter and the subtraction point via the signal propagation means and via means for forming the correcting signal.

According to a second aspect of the present invention there is provided a radar comprising a substantially continuously operable transmitter, a substantially continuously operable receiver and signal propagating means for simultaneously radiating the transmitter signal and for receiving a return signal wherein there are provided means for reducing carrier leakage and AM noise sidebands present in a signal path from the signal propagating means, said means comprising sampling means for coupling-out part of the signal to be transmitted, means for forming a correcting signal by adjusting the phase and amplitude of the coupled-out signal or a frequency down-converted version of the coupled-out signal, means in the signal path from the signal propagating means for subtracting the correcting signal from the signal in the signal path, means for detecting any residual noise in the difference signal from the subtracting means and for providing a low frequency control signal to said means for forming the correcting signal and delay means in at least one of the signal paths to the subtracting means for adjusting the propagation time of the signal in the one path to be equal to the propagation time in the other of the signal propagation paths to the subtracting means.

The use of a low frequency control signal enables the control loop to operate as a narrowband loop which has the effect of cancelling the presence of the carrier in the leakage signal.

The provision of the delay means facilitates the correlation of the AM noise sidebands in the correcting signal with the AM noise sidebands in the leakage signal thereby minimising the level of the noise sidebands in the return signal to be demodulated.

The receiver comprises a mixer which frequency down-converts or translates the return signal down to a convenient lower frequency, for example baseband, for subsequent processing in the rest of the receiver. FM noise in the leakage signal may be suppressed by ensuring that the propagation time of the local oscillator signal derived by coupling-out part of the transmitter signal to the local oscillator port of the mixer is the same as the propagation time of the leakage signal to the signal input of the mixer. By equalising these propagation times the noise sidebands will be correlated and thus will cancel each other. The propagation times may be adjusted using one or more delay devices.

It can easily be shown that if the path lengths are not matched, then the limitation on the cancellation of the AM noise sidebands at an offset f from the carrier caused by a path length difference T is $C = 4 \sin^2(\pi f T)$.

This is the same formula as applied to the cancellation of FM noise due to correlation, and was quoted in the previously mentioned British Patent Specification No. 2147473B. The mechanism of the cancellation is of course very different in the case of the suppression of AM noise sidebands, but it is not surprising that the formula should be the same, because the limitation in both cases is due to the loss of correlation in the modulation waveform over the time T.

This same formula also applies to the suppression of FM noise which can be obtained by the Reflected Power Canceller (RPC), and implies that for similar residual path length mismatches the RPC does no better than does the FM suppressor described in British Patent Specification No. 2147473B. The effects of the FM suppression and of the RPC are not multiplicative and one only does as well as the poorer one of them.

An RPC with a badly mismatched path length could actually make the FM noise worse than not having it at all. This happens because the FM sidebands on the leakage would be suppressed in the receiver, whereas, if the cancelling path length was badly mismatched, the FM sidebands of the cancelling signal would no long correlate with the leakage, nor would they be suppressed in the receiver, the L0 path length of which is assumed to be matched to the leakage path length.

The above mentioned simple formula indicates how good the path length match has to be in order to achieve a given degree of cancellation.

Removing AM noise prior to applying the received signal to the receiver means that it will not be detected and that there will be less noise in the output of the mixer in the receiver. This reduction of noise enables the radar to have an improved sensitivity.

BRIEF DESCRIPTION OF THE DRAWING

The present invention will now be described, by way of example, with reference to the accompanying drawing figures, wherein.

In the drawing figures the same reference numerals have been used to indicate corresponding features.

Figure 1:
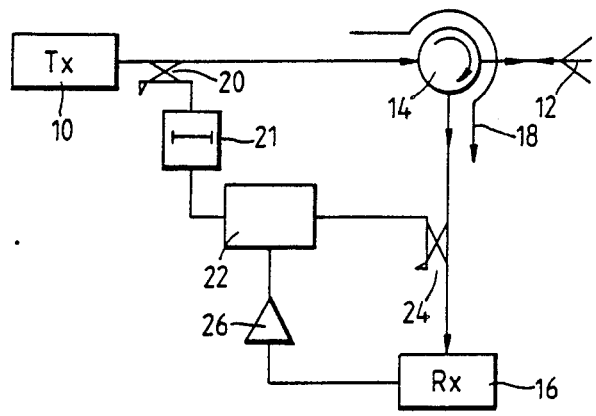
FIG. 1 is a block schematic diagram of one embodiment of a CW radar made in accordance with the present invention.

The CW radar shown in FIG. 1 comprises a transmitter (Tx)10, an antenna 12 coupled to the output of the transmitter 10 by way of a non-reciprocal means such as a circulator 14 which serves to separate the transmitted and received signals. A receiver (Rx)16 is coupled to the antenna 12 also by way of the circulator 14.

The operation of the radar described so far is known and straightforward. The transmitter 10 transmits a continuous wave signal which is reflected from an object within the range of the radar. The reflected or return signal is detected by the antenna 12 and is directed to the receiver 16 for recovery. The power of the received signal is less than that of the transmitted signal, the relative value being related to the range of the object. If desired, the signal to be transmitted may be frequency modulated with a signal which successively sweeps over a range of frequencies.

A problem with this type of radar is that a small portion of the AM noise in the transmitter signal leaks to the receiver 16 by way of a path 18 without having been first transmitted. This leakage, if having a high enough signal power, can lead to the receiver 16 being desensitised or damaged. Additionally the AM sidebands of the leakage signal may be high enough also to desensitise the receiver 16.

In order to reduce or eliminate these effects of leakage, a reflected power canceller circuit is provided. This circuit comprises a first directional coupler 20 which samples the transmitted signal continuously. The sampled signal, which functions ultimately as a cancelling signal, is delayed in a delay device 21 and is then supplied to a modulator 22 which adjusts the phase and amplitude of the signal so as to minimise the carrier leakage. The time delay introduced by the delay device 21 correlates the AM noise sidebands in the coupled-out signal with the AM noise sidebands in the leakage signal. The cancelling signal so formed is supplied to a second directional coupler 24 in the path from the circulator 14 to the receiver 16. The second coupler 24 functions as a subtractor by subtracting the cancelling signal from the leakage signal present in the signal path to the receiver 16.

A control loop is provided between the receiver 16 and the modulator 22. The control loop includes a control device 26 which in response to a low frequency signal indicative of the residual level of the leakage signal carrier level adjusts the amplitude and phase of the cancelling signal accordingly. Using a low frequency signal in the control loop enables it to have a narrow band which has the effect of cancelling the residual level of the carrier present in the leakage signal. If the control loop has a broader bandwidth loop then there is a possibility of wanted as well as unwanted signals being cancelled.

Figure 2:
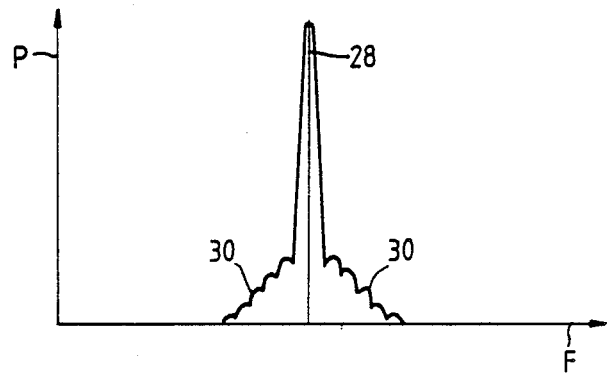
FIG. 2 is a graph of frequency, F, versus power, P, for the transmitted signal, that is, its frequency spectrum.

FIG. 2 illustrates the leakage signal which comprises a carrier 28 and AM sidebands together with FM noise sidebands 30. These sidebands 30 can be reduced or eliminated by relying on the fact that the instantaneous noise sideband structure of the cancelling signal is the same as that of the leakage signal because they are derived from a common source. If they are to be made to cancel they must arrive at the canceller, that is, the second directional coupler 24 in FIG. 1 after the same time delay. This can be achieved in the embodiment shown in FIG. 1 by adjusting the time delay of the device 21 to make the path lengths from the transmitter 10 to the second directional coupler 24 via the circular 14 and via the modulator 22 the same.

Figure 3:
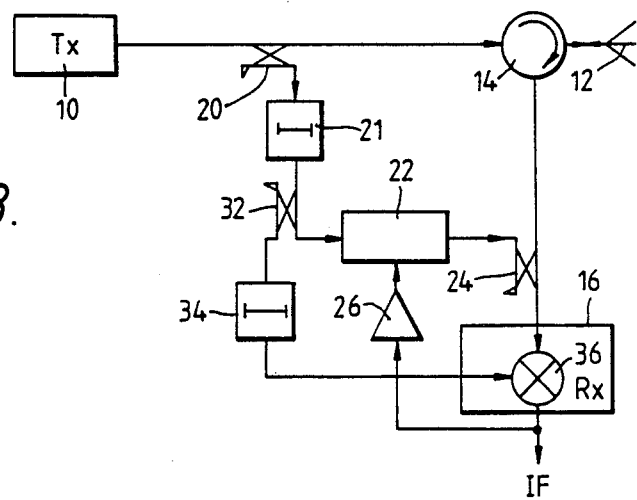
FIGS. 3 to 5 are block schematic diagrams of three other embodiments of a CW radar made in accordance with the present invention.

FIG. 3 illustrates a radar in which FM noise sidebands in the leakage signal are suppressed separately from the carrier and AM noise sidebands present in the leakage signal. Considering the carrier and AM noise sideband suppression first, the reflected power canceller circuit comprises the delay device 21 and the modulator 22 in the signal path between the first and second directional couplers 20, 24. The time delay introduced by the delay device 21 is arranged to equalise the path lengths between the transmitter 10 and the second directional coupler 24 by way of the circulator 14 and by way of the modulator 22, respectively.

The FM noise sidebands are suppressed by a circuit formed by a third directional coupler 32 for coupling-out a part of the output from the delay device 21. The third directional coupler 32 is coupled by way of a second delay device 34, to a mixer 36 in the receiver 16.

The mixer 36 is used to frequency down-convert the signals in the signal path from the circulator 14 prior to processing in the rest of the receiver. The FM noise sidebands in the leakage signal are suppressed by ensuring that the cumulative time delay introduced by the first and second delay devices 21, 34 is such as to make the leakage and mixer local oscillator path lengths substantially equal.

The time delay introduced by the delay device 21 is relatively long to compensate for the leakage path length and may be of the order of 5 nS (a meter of cable). In contrast the time delay introduced by the delay device 34 is relatively short, say one tenth of that introduced by the device 21, because it has to compensate for the delay through the modulator 22 and the second directional coupler 24.

For the canceller to work well over a range of RF frequencies, the shorter delay device 34 must be controlled to within a fraction of a wavelength. This can be done if the second and third directional couplers 24, 32, the modulator 22 and the mixer 36 are treated as one block. In a subsequent operation the longer delay device 21 can be set to adjust the leakage path length. If the delay device 21 is implemented by a cable its length can have a tolerance of several centrimeters.

This procedure will optimise the suppression of the FM sidebands on the cancelling signal.

In the circuit arrangement shown in FIG. 3 the mixer 36 follows the second directional coupler 24. However it is not critical if the AM noise sidebands are cancelled before or after the mixer 36. However one advantage of the illustrated arrangement is that normally the leakage signal carrier would overload the mixer 36 if it is not cancelled first.

Figure 4:
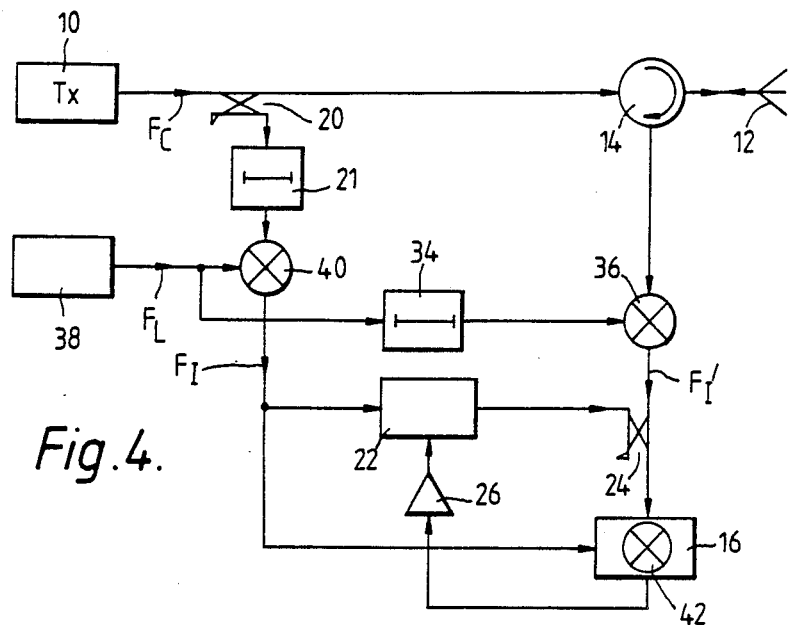

Referring to FIG. 4, the illustrated CW radar differs from that shown in FIG. 3 by having a separate local oscillator 38 which produces a local oscillator frequency $F_L$ which is lower than the carrier frequency $F_c$ produced by the transmitter 10. The local oscillator 38 is connected to a local oscillator port of a mixer 40. A signal port of the mixer 40 is connected by way of the delay device 21 to the first directional coupler 20 which provides a coupled-out portion of the transmitter carrier frequency $F_c$. The mixer 40 frequency down-converts the carrier frequency $F_c$ to an intermediate frequency (IF) $F_I$ and supplies the IF to the modulator 22 and to a low frequency mixer 42 in the receiver 16.

The local oscillator frequency $F_L$ is also supplied by way of a second delay device 34 to the local oscillator port of the mixer 36 which receives the antenna return signal and any leakage signal on its signal port. The mixer 36 frequency down-converts the antenna signal to an IF $F'_I$ and assuming that the delay introduced by the delay device 34 compensates for the leakage path length then the FM noise sidebands will be suppressed in the mixer 36.

The modulator 22 adjusts the phase and amplitude of the IF signal $F_I$ and its output is applied to the second directional coupler 24 in which the carrier leakage and AM noise sidebands present in the IF signal $F'_I$ are suppressed. The two IF signals FI and $F'_I$ are applied to the respective ports of the low frequency mixer 42 which provides an output at baseband. This output is utilised by the control device 26 to adjust the phase and amplitude of the modulator 22 output.

Introducing an IF phase into the embodiment shown in FIG. 4 enables the modulator 22 to be constructed to operate at a lower frequency than in the embodiments shown in FIGS. 1 and 3. For example if $F_c$ is 9 GHz and $F_L$ is 8.94 GHz then $F_I$ will be 60 MHz.

Figure 5:
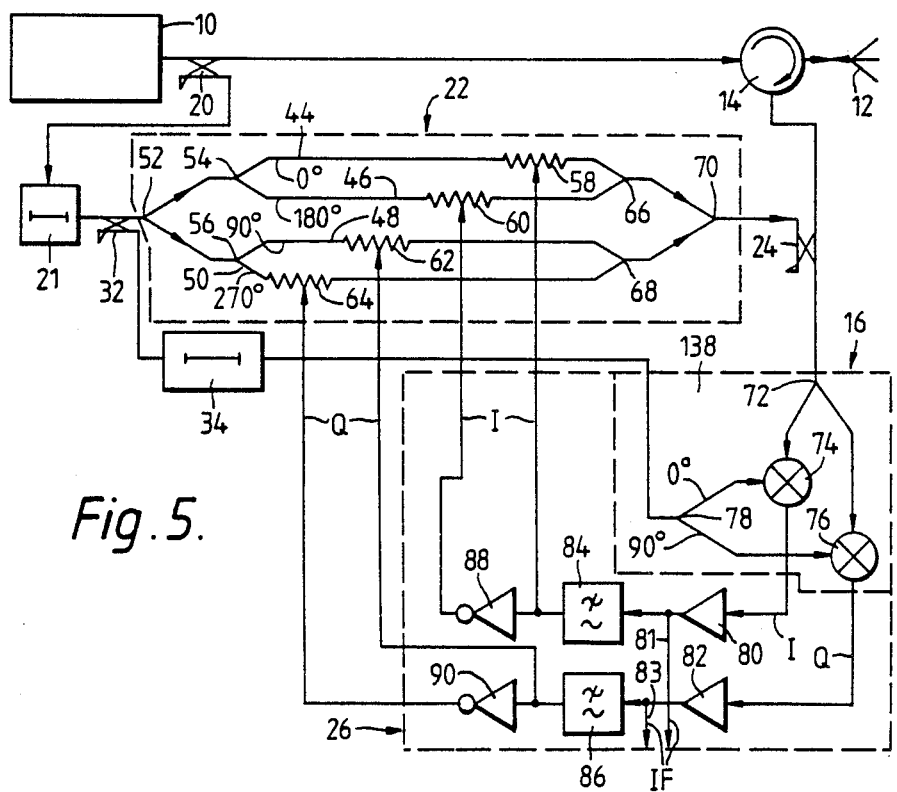

FIG. 5 illustrates an embodiment of the invention which is based on the modified version of the embodiment shown in FIG. 3. The FIG. 5 embodiment allows full control of the amplitude and phase of the cancelling signal over all four quadrants of phase. Referring to FIG. 5 the first directional coupler 20 couples-out a portion of the transmitted signal which is applied to the delay device 21 which serves to equalise the path lengths in order to obtain AM noise sideband suppression as described previously. The directional coupler 32 couples-out part of the delayed transmitter signal and applies it by way of the delay device 34 to the local oscillator port of a quadrature mixer 138 in the receiver 16.

The output of the delay device 21 is connected to the modulator 22 which is constructed so as to function as a vector modulator. The signal input of the modulator 22 is split into four paths 44, 46, 48, 50 by means of 3 dB power splitters 52, 54, 56. The paths 44, 46 are regarded as the in-phase (I) paths having relative phase shifts of 0 degrees and 180 degrees, respectively. The paths 48, 50 are regarded as the quadrature-phase (Q) paths having relative phase shifts of 90 degrees and 270 degrees, respectively. Voltage controlled attenuators 58, 60, 62 and 64 are provided in the paths 44, 46, 48 and 50, respectively. Control voltages for the attenuators 58 to 64 are derived from the control device 26. Signal outputs from the attenuators 58 to 64 are combined using power combiners 66, 68, 70. The output of the final combiner 70 is connected to the second directional coupler 24 which serves to suppress the carrier and AM sidebands present in the leakage signal.

The quadrature mixer 138 comprises a 3 dB power splitter 72 coupled to the signal path from the circulator 14. The power splitter 72 has two outputs coupled to first inputs of mixers 74, 76 respectively. The second inputs to the mixers 74, 76 comprise quadrature related outputs of a 3 dB power splitter 78 whose input is connected to the signal output from delay device 34.

The I output from the mixer 74 is applied by way of an amplifier 80 to an IF output 81 and to a low pass filter 84. The output of the filter 84 is connected to a control input of the attenuator 58 and to an inverter 88 whose output is connected to a control input of the attenuator 60.

The Q output of the mixer 76 is applied to a similar signal path as the I signal, which path comprises an amplifier 82 which is connected to IF output 83 and to a low pass filter 86. The output of the filter 86 is connected to the control input of the attenuator 62 and to an inverter 90 whose output is connected to the control input of the attenuator 64.

The operation of the circuit is essentially the same as described with reference to FIG. 3. The time delays introduced by the delay devices 21, 34 are made equal to the leakage path length and to the delay through the modulator 22 and the directional coupler 24, respectively. Carrier leakage and AM noise sidebands are suppressed by subtraction at the location of the directional coupler 24 and the FM noise sidebands are suppressed in the quadrature mixing operation.

The present invention is applicable to other radars which receive signals whilst the transmitter is operating such that transmitter leakage can become a problem. Such radars may use waveforms other than CW. Also it should be noted that it is not essential for the radar to have only one antenna 12. If required the transmitter 10 may be connected to its own antenna and a separate juxtaposed antenna is provided for the return signal. With such an arrangement the circulator 14 is omitted but leakage occurs between the transmitting and receiving antennas.

I claim:

1. In a radar including a transmitter for producing a CW transmitter signal, an antenna coupled to the transmitter through a first coupling path for radiating the CW signal and receiving a return signal, a receiver coupled to the antenna through a second coupling path, and a feedthrough path through which a leakage portion of the CW signal is coupled to the second coupling path, said leakage portion including a carrier an AM sidebands, the improvement comprising means for reducing the magnitude of said leakage portion of the CW signal which is coupled to the receiver, said means comprising:
   a. coupling means coupled to the first coupling path for producing a reduced-magnitude sample of the CW transmitter signal;
   b. correction means having an input coupled to the first coupling path for adjusting the phase and amplitude of the sample to produce a correction signal including said carrier and AM sidebands;
   c. subtraction means coupled to the correction means and to the second coupling path for subtracting the correction signal from the return signal to reduce the leakage portion of the CW signal coupled to the receiver;
   d. time delay means for effecting correlation at the subtraction means of the AM sidebands in the correction signal and in the leakage portion of the CW signal, thereby minimizing and residual of the AM sidebands in the return signal coupled to the receiver; and
   e. detection means coupled to the receiver for detecting any residual of the leakage portion and coupled to the correction means for producing a low frequency control signal to effect adjustment of the phase and amplitude of the correction signal to reduce said residual.

2. A radar as in claim 1 including means for reducing FM noise sidebands in the leakage portion of the CW signal coupled to the receiver, said means including a mixer having a first input coupled to the transmitter for receiving a sample of the CW transmitter signal, a second input coupled to the second coupling path, and time delay means for effecting correlation at the mixer inputs of the FM sidebands in said sample of the CW transmitter signal and in the leakage portion of the CW transmitter signal.

3. A radar as in claim 1 or 2 where the correction means comprises a vector modulator.

4. A method of reducing the effects of leakage in a radar including a transmitter for producing a CW transmitter signal, an antenna coupled to the transmitter through a first coupling path for radiating the CW signal and receiving a return signal, a receiver coupled to the antenna through a second coupling path, and a feedthrough path through which a leakage portion of the CW signal is coupled to the second coupling path, said leakage portion including a carrier and AM sidebands, the improvement comprising means for reducing the magnitude of said leakage portion of the CW signal which is coupled to the receiver, said method comprising:
   a. producing a reduced-magnitude sample of the CW transmitter signal;
   b. adjusting the phase and amplitude of the sample to produce a correction signal including said carrier and AM sidebands;
   c. subtracting the correction signal from the return signal to reduce the leakage portion of the CW signal coupled to the receiver;
   d. time delaying the arrival at the subtraction means of at least one of the correction signal and the leakage portion of the CW signal to effect correlation of the AM sidebands in the correction signal and in the leakage portion of the CW signal, thereby minimizing any residual of the AM sidebands in the return signal coupled to the receiver; and
   e. detecting any residual of the leakage portion coupled to the receiver and producing a low frequency control signal to effect adjustment of the phase and amplitude of the correction signal to reduce said residual.

* * * * *